Patented May 15, 1928.

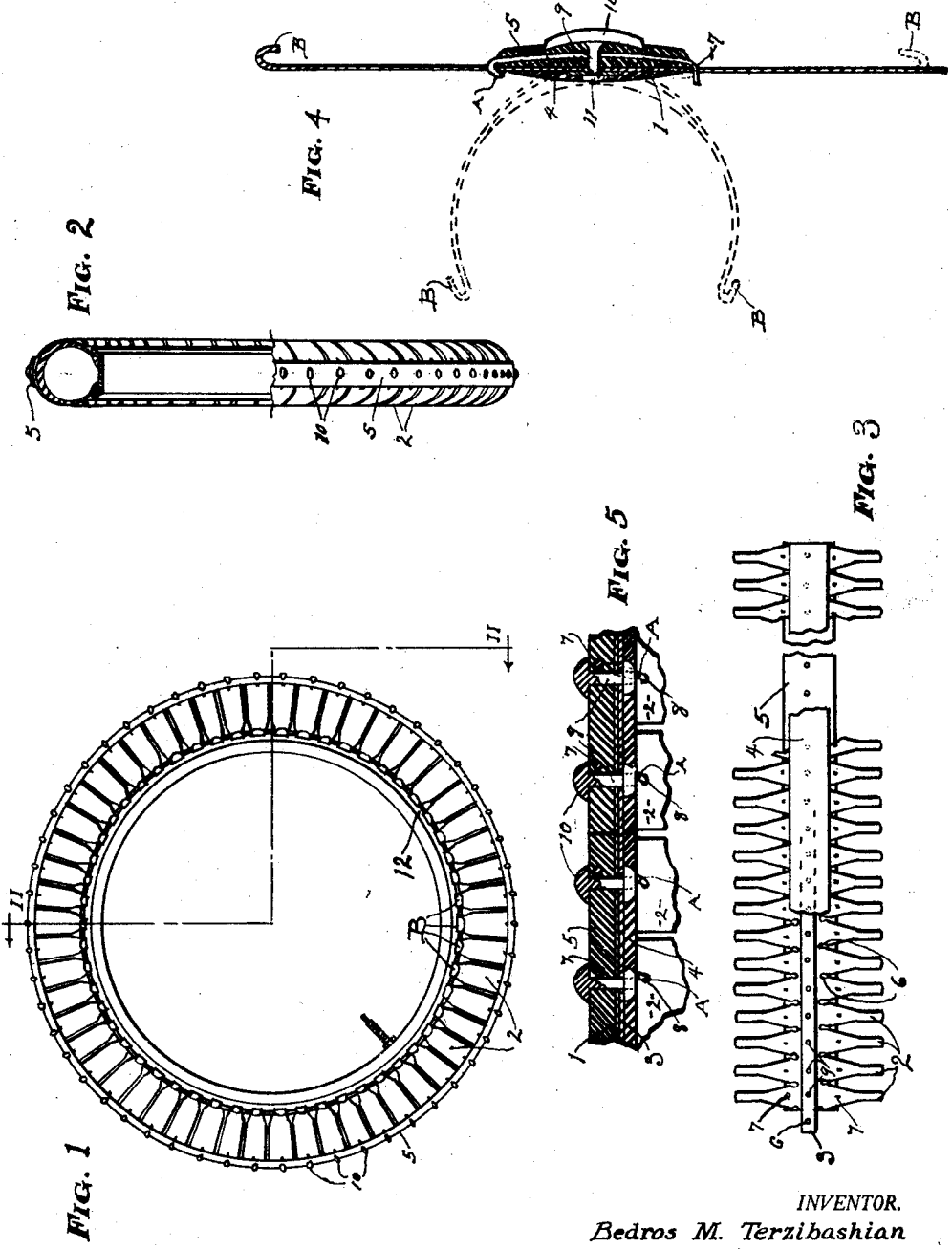

1,669,954

UNITED STATES PATENT OFFICE.

BEDROS M. TERZIBASHIAN, OF WICHITA, KANSAS.

PNEUMATIC-TIRE COVER.

Application filed February 11, 1926. Serial No. 87,596.

My invention relates to pneumatic tire covers.

The object of my invention is to provide a puncture proof cover for pneumatic tires.

A further object of my invention is to provide a nonskid feature for pneumatic tires.

A still further object of my invention is to provide a cover to protect the casing from undue wearing by traction or unexpected abuse.

A still further object of my invention is to provide a covering protecting the tread and the side walls of the tire.

These and other objects will hereinafter be more fully explained.

Referring to the drawings:

Fig. 1 is a side elevation of the device as applied to the tire.

Fig. 2 is a transverse view partly in section, taken on line II—II looking in the direction of the arrows.

Fig. 3 is an inside view of the cover before being bent to conform to the shape of the tire.

Fig. 4 is an enlarged transverse section through Fig. 3.

Fig. 5 is an enlarged detailed longitudinal section approximately along the center of the tread.

My invention herein disclosed consists of a metal strip 1 cut to form a plurality of laterally extending members 2, and a strip of metal 3 centrally positioned on first said strip as shown in Fig. 3, the said strips being rigidly connected by means of rivets or spot welding. Over the inside of metal strips 3 is placed a rubber band 4, and on the opposite or outside of strip 1 I have placed a rubber tread 5, and as means of connecting the said band and tread, perforations 6 have been drilled at the base where the members 2 terminate; the perforations being on opposite sides of the metal strip 3. When the tread has been properly placed as shown in Figures 3 and 4, the mechanism is placed in a clamp where it is vulcanized causing the rubber to adhere to the metal and join through the said perforations.

As a second means for securing the rubber members firmly in position I have placed a plurality of wires 7 passing transversely through the tread member with the ends protruding on both sides sufficient to be bent and passed through apertures 8 and clinched as shown at A in Figures 4 and 5. The last said securing means are to prevent lateral displacement of the tread.

As a nonskid feature I have placed a plurality of bolts 9 distributed along the periphery of the tread, said bolts each having an elongated head 10 positioned transversely on the tread and tensioned by a nut 11 threadedly attached to the bolt, the said nut being imbedded in the rubber band 4 as means to prevent turning and detaching.

The outer ends of the lateral extending members 2 are adapted to be bent forming a hook as at B in which will engage rings 12 as securing means for the cover when placed on the tire.

The tire cover herein described may be manufactured in strips of sufficient length to reach around tires of varying sizes and made in such a way that the metal strip 3 will extend past the end of the metal strip 1, and the opposite end extension will be reversed so that a perforation C in the end of the strip 3 will register with a like perforation in the end of strip 1, then by passing a bolt through said apertures which are in registry with each other is means for connecting the ends firmly; the cover thus formed is placed on the tire at which time the lateral members are bent around the casing preparatory to placing the rings 12, and after the rings have been placed engaging in all of the hooks the hooks may then be closed over the rings; and to remove the form the hooks may be opened by bending outward allowing the rings to move freely therefrom.

To place to engagement with the hooks the cover is first placed on the tire and the rings placed in a portion of the hooks then springing the casing inward at intervals all of the hooks may be engaged on the rings. It will be understood the diameter of the ring is greater than the bead of the tire, also greater than the flange of the rim to prevent interference when the casing is placed on the rim or being removed therefrom. It is shown and will be understood that resiliency is retained by the metal strip 1 being cut from near the center forming members laterally extending as heretofore described, and the said members converging toward the outer ends to allow for the curvature of the strip when bent to an annular form, and the curvature of the members conforming to the shape of a tire will allow the said members to spring when the load is imposed at the traction point. In addition to this provision a rubber lining engages on the tread of the tire and a rubber tread on the exterior of the cover.

Such modifications may be made as lie within the scope of the appended claims.

Having thus described my invention, what I claim as new and desire to secure by Letters Patent is:—

1. In a pneumatic tire cover, a metal strip, laterally extending members along both edges of said strip, said members being curved to conform to the shape of the casing, a metal strip intermediately positioned to said lateral members and extending longitudinally with first said strip, means for causing said strips to adhere firmly together, a rubber band to cover last said strip, a rubber tread attached to the opposite sides, said band engaging on first said strip, the said tread and band vulcanized firmly to said strips, bolts engaging through said bands and strips, an elongated head on said bolts, hooks on the outward ends of said lateral members, rings engaging in said hooks, all for the purpose described.

2. In a pneumatic tire cover in combination with a pneumatic tire, a metal strip having a plurality of laterally extending members, said members converging from near the center of said strip to the outer ends thereof, hooks bent on the ends of said members, perforations in said strips, said perforations positioned between said laterally extending members and near the base thereof, perforations in the base of said members, a metal strip centrally positioned and extending longitudinally on first said strip, said strips being attached by welding or other means, a rubber band covering last said metal strip, a rubber band on the opposite side applied to first said metal strip, last said band functioning as a tread, a plurality of wires transversely extending through last said strip having the ends thereof protruding, the ends of said wires adapted to engage in the perforations in the base of said laterally extending members, the said rubber bands vulcanized so that the rubber will join through the perforations that are between and near the base of said laterally extending members, elongated bolt heads transversely positioned on the band functioning as a tread, annular rings engaging in said hooks as means for binding said strips to the tire.

3. In a pneumatic tire cover, in combination with a pneumatic tire a metal strip having the edges severed forming a plurality of laterally extending members, the said members being bent to conform to the side walls of the tire, a re-enforcing metal strip centrally positioned on first said strip and firmly attached thereto, a rubber band as an inside lining and a rubber band on the outside as a tread, means for attaching last said band to first said strip, vulcanizing means attaching said bands to said strips, means for ataching the ends of said metal strips when placed on the tire, bolts having elongated heads, said bolts being distributed along the tread of said cover, rings engaging with the hooks of said lateral extending members, all substantially as shown and for the purpose described.

BEDROS M. TERZIBASHIAN.